(12) United States Patent
Bayram et al.

(10) Patent No.: US 12,504,272 B2
(45) Date of Patent: Dec. 23, 2025

(54) SYSTEM AND METHOD FOR DETERMINING THE THICKNESS OF A MATERIAL IN MANUFACTURING VESSELS

(71) Applicant: PaneraTech, Inc., Chantilly, VA (US)

(72) Inventors: Yakup Bayram, Falls Church, VA (US); Minh Quang-QuocTran, Ashburn, VA (US)

(73) Assignee: PaneraTech, Inc., Chantilly, VA (US)

( * ) Notice: Subject to any disclaimer, the term of this patent is extended or adjusted under 35 U.S.C. 154(b) by 348 days.

(21) Appl. No.: 17/947,696

(22) Filed: Sep. 19, 2022

(65) Prior Publication Data

US 2024/0093983 A1 Mar. 21, 2024

(51) Int. Cl.
| | |
|---|---|
| *G01B 11/06* | (2006.01) |
| *G01B 11/30* | (2006.01) |
| *G01B 15/02* | (2006.01) |
| *G01B 15/08* | (2006.01) |
| *G01B 17/02* | (2006.01) |
| *G01B 17/08* | (2006.01) |

(52) U.S. Cl.
CPC ............ *G01B 11/06* (2013.01); *G01B 11/303* (2013.01); *G01B 15/02* (2013.01); *G01B 15/08* (2013.01); *G01B 17/02* (2013.01); *G01B 17/08* (2013.01)

(58) Field of Classification Search
CPC ...... G01B 11/06; G01B 11/303; G01B 15/02; G01B 15/08; G01B 17/02; G01B 17/08
See application file for complete search history.

(56) References Cited

U.S. PATENT DOCUMENTS

| | | | | |
|---|---|---|---|---|
| 4,269,397 A | * | 5/1981 | Strimple | C21B 7/24 73/86 |
| 4,442,706 A | | 4/1984 | Kawate et al. | |
| | | (Continued) | | |

FOREIGN PATENT DOCUMENTS

| | | | | |
|---|---|---|---|---|
| JP | WO0055575 | * | 9/2000 | ............ G01N 21/88 |
| WO | 9917106 | | 4/1999 | |
| WO | 2022133173 | | 6/2022 | |

OTHER PUBLICATIONS

International Search Report issued in co-pending international application No. PCT/US22/43995 on Feb. 10, 2023.

*Primary Examiner* — Lisa M Caputo
*Assistant Examiner* — Sharah Zaab
(74) *Attorney, Agent, or Firm* — Whiteford, Taylor & Preston, LLP; Gregory M. Stone

(57) ABSTRACT

Disclosed is a system and a method for determining the thickness of a refractory material forming part of a manufacturing vessel, such as a furnace or ladle, using a surface profile scanning while the vessel is maintained at operating temperatures. The system and method are operative to determine the relative positionings of an internal surface and the corresponding external surface of such material, based on a plurality of surface profile data scans. Additionally, a computational algorithm can process these data and/or other data to determine certain flaws of the refractory material, including the presence of gaps within and bending or deformation of such material for a more accurate determination of its thickness. This provides a way to early warn a user of the risk of continuing operating the vessel, achieve a higher operational safety, and more accurately estimate both the remaining operational life and the maintenance plan of the vessel.

21 Claims, 4 Drawing Sheets

(56) References Cited

U.S. PATENT DOCUMENTS

| | | | |
|---|---|---|---|
| 6,198,293 B1 | 3/2001 | Woskov et al. | |
| 9,255,794 B2 | 2/2016 | Walton et al. | |
| 10,859,316 B1 | 12/2020 | Richter et al. | |
| 2009/0066344 A1* | 3/2009 | Bray | G01B 15/02 |
| | | | 324/644 |
| 2013/0120738 A1* | 5/2013 | Bonin | G01B 11/06 |
| | | | 356/72 |
| 2016/0018341 A1* | 1/2016 | Harvill | G01B 11/303 |
| | | | 356/240.1 |
| 2021/0096093 A1* | 4/2021 | Richter | F27B 14/20 |
| 2022/0196396 A1* | 6/2022 | Bayram | C21C 5/4673 |

* cited by examiner

SYSTEM AND METHOD FOR DETERMINING THE THICKNESS OF A MATERIAL IN MANUFACTURING VESSELS

FIELD OF THE INVENTION

The present invention relates to systems and methods for evaluating the status of a material. More particularly, the present invention relates to sensing systems and methods for determining the thickness of a material in vessels used in manufacturing.

BACKGROUND OF THE INVENTION

A variety of manufacturers, including those in the glass and metallurgical industries, use vessels such as furnaces and ladles, to melt, treat, refine, and transport the raw material used for processing. Some of these vessels may reach a length equivalent to the height of a 20-story building and are key assets for manufacturers in terms of costs and operational functionality. In order to minimize the internal heat loss at high operating temperatures, which may be in excess of 2000° F., these vessels are constructed using refractory material, having very high melting temperatures and good insulation properties, to create a refractory melting chamber. However, the inner refractory walls of a manufacturing vessel will degrade during operation. The effects of this degradation include refractory erosion, refractory corrosion, stress cracks, and refractory material diffusion into the molten material.

Even the areas of the inner refractory walls that are not in contact with molten material degrade over time due to their exposure to combustion and high temperatures inside these vessels. In addition, due to the extreme operating conditions, stress cracks can grow over time and create gaps within the refractory material, which may lead to bending or deformation of the internal wall or to a partial collapse of the vessel's refractory material. As a result, the measured thickness of the refractory material may depend on the measurement technique used and may be uncertain, which would mislead manufacturers regarding the actual thickness of the refractory material. Accordingly, manufacturers may face an increased risk of and the need to conservatively shut down the vessel for conducting unscheduled re-build or repair to maintain the structural integrity of the vessel.

In glass manufacturing vessels, the surface condition of internal and external walls, refractory material thickness and homogeneity, and rate of erosion of the refractory material are some of the important aspects that may require monitoring and evaluation. Specifically, during glass melting the high temperature atmosphere and combustion lead to refractory failures, such as melting of the glass furnace crown, rat holes, failure of breast wall, and delamination of refractory walls. The importance of these aspects relies on their role to provide useful information to estimate the thickness of the refractory material and the remaining operational life of the vessel. In general, several evaluation systems and methods have been disclosed within various industries for measuring the thickness of a material, using one or a combination of more than one of a variety of devices or techniques, including ultrasound units, thermal imaging cameras, radars, infrared detectors, stereovision cameras, LIDAR, and laser scanners, to ultimately indicate whether the condition of the manufacturing vessel is suitable for operation.

Particularly, laser scanning devices have been used by manufacturers in the steel industry since the 1970s. However, early "hot" laser mapping, while the vessel is at operating temperatures, was limited by the scanning speed and processing capabilities of the available technology. Nowadays, laser technology systems can take and process millions of data samples per second by constantly collecting data via a mirror rotating rapidly on two axes. This means that high resolution scans can be efficiently and affordably collected, and "hot" laser mapping of refractory linings has matured into a powerful tool for time and cost savings, operational safety improvements, and productivity optimization in manufacturing industries.

Recently, laser scanning has increasingly been incorporated into manufacturing processes, providing real-time data and more exact control over processes and decision making without any delay to production. Laser scanning technology is not reliable for addressing issues such as determining the presence of gaps within multiple layers of refractory, or the depth and size of cracks in, the refractory material of a vessel or estimating the penetration of molten material into the refractory material. These issues may result from the potential falling off of the refractory material into the vessels. As a result, measurement and processing techniques and methods, along with computational software and other hardware, are required to be integrated with laser scanning devices to effectively address these issues. In other words, a system and a method can be used to determine the thickness of and how the refractory material of the vessel is deteriorating to improve the operational safety of the manufacturing process.

Specifically, the determination of the thickness of refractory material in a manufacturing vessel has been addressed in the prior art, as described in U.S. Pat. No. 6,198,293 to Woskov et al. and U.S. Pat. No. 9,255,794 to Walton et al. However, these efforts are based on the use of microwave signals that penetrate the material of interest, such as a furnace wall, to measure its thickness and have faced certain challenges and limitations. In particular, attempts made to determine furnace wall thickness on hot furnaces have been generally unsuccessful because of the large signal losses involved in evaluating the inner surface of refractory materials, especially at relatively high frequency bands. Likewise, at relatively low frequency bands signals still experience losses and are limited in terms of the bandwidth and resolution required by existing systems.

Additional attempts have been made to assess the status and thickness of a refractory lining using laser scanning, which uses signals that do not penetrate the material under test, as described in U.S. Pat. No. 10,859,316 to Richter et al. However, this approach is constrained to collecting multiple laser scans of the interior of a metallurgical vessel prior to and after each heat of the vessel, while the vessel is empty (not processing molten material) and not at operating temperatures, to determine an exposure impact of the heat on the refractory lining by comparing the collected pre-heat structural condition data with the collected post-heat structural condition data. In addition, there are other limitations and challenges faced by this attempt. In addition, there is a lack of practicality for glass furnace applications due to the significantly larger dimensions of glass furnaces compared to those of metallurgical vessels, the limited accessibility to and visibility of the internal walls of the glass furnace, through small peepholes, while the furnace is at operating temperatures, and the larger campaign duration of glass furnaces. As a result, measuring the thickness of the refractory material in a glass furnace based on this is not possible.

Further, the use of laser scanning for conducting "hot" measurements in glass furnaces has been reported by Corey Forster in the "Laser mapping the future of glass furnaces" technical article, published in the May/June 2020 issue of Glass Worldwide. In particular, this article reports on the successful use of a laser scanning device to collect refractory lining data in a glass furnace at an operating temperature of 2700° F. to determine the depth of the spalling apparent from earlier infrared imaging. Additionally, later work expanded the evaluation for estimating the distance from the laser device to the back wall of the furnace. However, the article specifically mentions that this technique failed to determine the refractory material thickness due to the lack of a baseline reference point.

In a glass furnace, the unmonitored or inaccurate determination of the thickness of the refractory material may result in the need of conducting furnace relining and repairs at a substantially earlier time than needed. This leads to significant costs for manufacturers in terms of their initial and periodical investment and the reduced production capacity over the operational life of the vessel. In general, the areas of the refractory material that are exposed to the flow of molten material, such as molten glass, at high temperatures may erode and degrade the inner surface of the refractory material at a faster pace than the areas of the refractory material that are not exposed to the molten material.

Thus, it is critical for manufacturing vessel operators to efficiently plan maintenance and monitor refractory material degradation of the vessel walls to extend the operational life of the vessel and plan required outages of the vessel when it is necessary. The lifetime and operational capability of a glass furnace is linked to the degradation and thickness of the refractory material over time, which might be affected by a number of factors, including the operational age, the average temperature of operation, the heating and cooling temperature rates, the range of temperatures of operation, the number of cycles of operation, and the type and quality of the refractory material. Each of these factors is subject to uncertainties that make it difficult to create accurate estimates of the expected lifetime of a furnace and when to perform the corresponding maintenance tasks.

Accordingly, determining the thickness of refractory material in manufacturing vessels is crucial in industries where asset uptime is critical and asset downtime must be maintained to a minimum, while operating safely. Accurately determining the refractory material thickness will enable manufacturers to minimize repairs and keep the asset uptime. Therefore, there is a need, which is fulfilled by the present invention, to accurately determine the thickness of the refractory material in a manufacturing vessel, using a laser scanning device while the vessel is at operating temperatures, and wherein the accessibility to, and visibility of, the interior of the vessel is very limited, which is the case for the large structure of a glass furnace. In addition, the present invention may allow to assess the potential presence of gaps within the refractory material and the level of bending and deformation of such material, which will affect the determination of the refractory material thickness. As a result, vessel operators will have ample time to properly plan for maintenance and more safely operate the vessel, since as the refractory material gets thinner, the likelihood of a leakage of molten material gets higher.

Currently, there is no well-established system or method that can deterministically estimate the thickness of the refractory material in a manufacturing vessel, using laser scanning, while the vessel is maintained at operating temperatures. The lack of such system or method impairs the ability to operate the vessel with a higher safety confidence and to more accurately estimate both the remaining operational life and the maintenance plan of a vast number of manufacturing vessels. Thus, there remains an opportunity for a system and method, based on the integration of a laser scanning device with computational software and additional hardware, to accurately determine the thickness of the refractory material of vessels used in manufacturing.

SUMMARY OF THE INVENTION

A system and a method for determining the thickness of a refractory material forming part of a manufacturing vessel, such as a furnace using a surface profile scanner while the vessel is maintained at operating temperatures are disclosed herein. One or more aspects of exemplary embodiments provide advantages while avoiding disadvantages of the prior art. The system and method are operative to determine the relative positionings of an internal surface and the corresponding external surface of such material, based on a plurality of surface profile data scans. Additionally, a computational algorithm can process these data and/or other data to determine certain flaws of the refractory material, including the presence of gaps within, and bending or deformation of, such material for a more accurate determination of its thickness. This provides a way to early warn a user of the risk of continuing operating the vessel, achieve a higher operational safety, and more accurately estimate both the remaining operational life and the maintenance plan of the vessel.

The system for determining the thickness of a refractory material forming part of a manufacturing vessel, such as a furnace, comprises two primary subsystems. First, a surface profile subsystem to characterize the surface roughness of the material under evaluation and to collect reference positioning data points of the manufacturing vessel. Second, a data processing subsystem to process the data collected using a computational algorithm for determining the thickness of the refractory lining and certain flaws, such as the presence of gaps within, and the level of bending of the internal wall of, the refractory material. These flaws can be determined by processing the data collected by the surface profile subsystem and/or collecting additional data to correlate the processed data with a condition or level of degradation of this material.

In particular, the first sensor collects, preferably simultaneously and from a single position, surface roughness and reference positioning data of the internal wall of the refractory material under evaluation. Additionally, the first sensor collects reference positioning data of the external wall of the refractory material of the manufacturing vessel. Then, by processing and correlating the reference positioning data of the internal and external walls of the refractory material of the vessel and the surface roughness of the material under evaluation, the system can determine the spacing between these walls to ultimately determine the thickness of the refractory material of the vessel.

The data processing subsystem comprises a main computer-based processor further comprising a data storage device and an executable computer code or computational algorithm, configured to process the data collected by the first sensor, other historical data, operational and process parameters, and the user's input. The data processing subsystem may also be configured to process data or information from a second sensor, which may include one or a combination of more than one of an ultrasound unit, a laser scanner, a LIDAR-based device, a stereovision camera, and a radar.

Moreover, time domain-based and/or frequency domain-based signal processing techniques or a combination of both may be used to determine and visualize the status of the evaluated area of interest. Thus, the data processing subsystem can generate a variety of outcomes as a result of evaluating a manufacturing vessel. These outcomes may include a determination or estimation of the remaining thickness, the surface profile, or the rate of degradation over time of the refractory material of the vessel as well as the potential presence of a gap within the refractory material or a level of bending of the internal wall of the refractory material. Accordingly, these outcomes can be used to early warn a user about the future operation of the vessel or the remaining operational life of the vessel.

In the present invention, the first and second sensors are preferably disposed not in physical contact with the manufacturing vessel. However, any of the various types of sensors that may be used to collect information prior, during, or after operation of the vessel may be disposed not in physical contact with, embedded in the refractory material of, or in physical contact with the vessel, according to the type of sensor used. In addition, different attachment mechanisms might be incorporated with any of these sensors to physically position the sensor inside or outside the vessel's chamber at one or more locations.

The method for determining the thickness of a refractory material forming part of a manufacturing vessel, such as a furnace or a ladle, involves the steps of collecting surface roughness and reference positioning data of the internal wall of the refractory material under evaluation, and reference positioning data of the external wall of the refractory material of the manufacturing vessel. The method further includes the steps of processing the surface roughness and reference positioning data; calculating the spacing between the internal and external walls of the refractory material of the vessel; and estimating the location and dimensions of gaps within, the level of bending of, and the wearing of the refractory material of the vessel. The method also includes determining the thickness of the refractory material of the vessel. The method further includes processing the data collected, determined, measured, or calculated to analyze, forecast, and provide information useful to estimate the remaining operational life and improve the maintenance plan of the vessel under evaluation.

By integrating at least a surface profile subsystem with customized computer processing tools and a computer-based processor, the system and method are able to accurately determine the remaining thickness of the refractory material of a vessel. This translates into more effective and accurate scheduling to better manage the costly processes of manufacturing vessel repairs, decommissioning, or replacement along with a significant reduction of the level of risk of unscheduled repairs and operational disruptions of the vessel. Thus, the system and method allow a more effective operational assessment of manufacturing vessels, which may result in a reduction of operational uncertainty and safer operations along with a potential extent of the operational life and an improved maintenance scheduling of such costly assets.

BRIEF DESCRIPTION OF THE DRAWINGS

The numerous advantages of the present invention may be better understood by those skilled in the art by reference to the accompanying drawings in which.

DETAILED DESCRIPTION OF THE INVENTION

The following description is of particular embodiments of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

The system for determining the thickness of a refractory material forming part of a manufacturing vessel, such as a furnace comprises a surface profile subsystem and a data processing subsystem. The surface profile subsystem characterizes the surface roughness of the material under evaluation and collects reference positioning data points of the manufacturing vessel. The data processing subsystem uses a computational algorithm for determining the thickness of the refractory material. However, the data processing subsystem may also determine or estimate the surface profile and the rate of degradation over time of the refractory material of the vessel as well as the potential presence of a gap within the refractory material and a level of bending of the internal wall of the refractory material.

Figure 1:
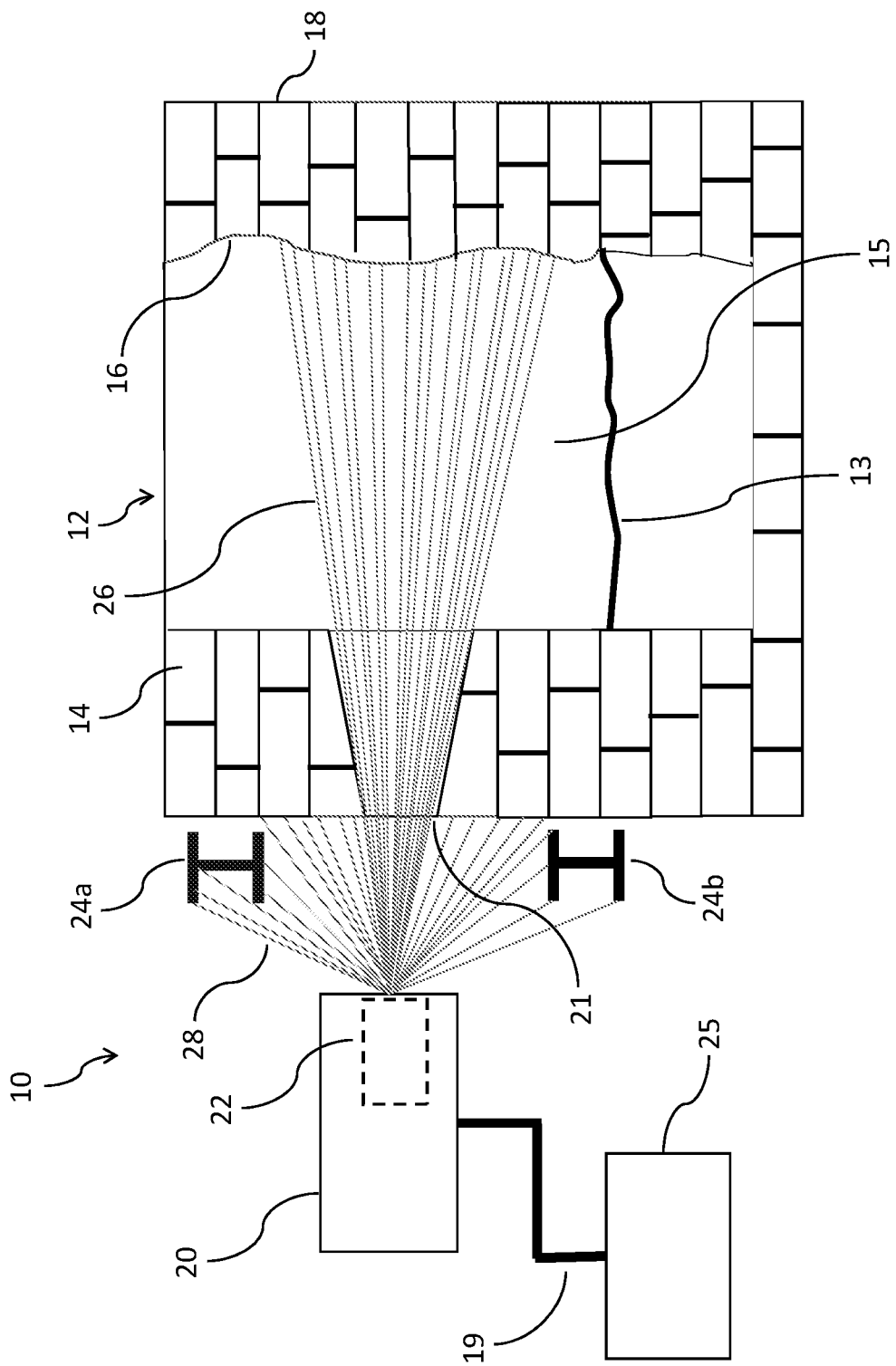
FIG. 1 shows a schematic side view of a first exemplary embodiment of a system and a set up for collecting a first set of data for evaluating a refractory material in a manufacturing vessel.

In accordance with certain aspects of an embodiment of the invention, FIG. 1 shows a schematic side view of a first exemplary embodiment of a system 10 set up for collecting a first set of data for evaluating a manufacturing vessel 12. Usually, vessel 12 comprises a plurality of layers of a refractory material 14. Typically, the various layers of refractory material 14 are formed using bricks disposed side-by-side from the bottom to the top of vessel 12. In other words, refractory material 14 is disposed in one or more layers between a chamber 15, wherein melting of a material, such as glass, takes place during operation of the vessel, and the external bottom and external side walls of vessel 12. Accordingly, refractory material 14 forms one or more walls at least partly surrounding chamber 15 of vessel 12.

Thus, refractory material 14 has an innermost surface 16, which might be partly contiguous to (i.e., in contact with) a molten material, such as glass, contained within chamber 15 during operation of vessel 12, and an outermost surface 18 closer to the exterior region surrounding vessel 12. Innermost surface 16 is at least partly not contiguous to molten material in areas above a molten material level 13. Vessel 12 may have an outer shell (not shown) surrounding refractory material 14. As a result, an external surface of vessel 12 may comprise either outermost surface 18 of refractory material 14 or at least part of an outer shell. In reference to FIG. 1, the external surface of vessel 12 consists of outermost surface 18.

In this particular configuration, system 10 comprises a surface profile subsystem 20, which is used to collect a first set of data comprising information associated with an evaluation of a region of interest of innermost surface 16 of refractory material 14, while vessel 12 is maintained at operating temperatures of up to more than 2000° F. Specifically, the region of interest of innermost surface 16 of refractory material 14 consists of an area that is not contiguous to the molten material being processed in vessel 12. The first set of data further comprises reference positioning information associated with one or more structures of vessel 12.

Surface profile subsystem 20 comprises at least one first sensor 22 able to measure the distance between surface profile subsystem 20 and the region of interest under evaluation of innermost surface 16 of refractory material 14 through a peephole 21. Preferably, the distance measurements performed by surface profile subsystem 20 should have a resolution in the order of millimeters to allow measuring the surface roughness or mapping the topography of the surface under evaluation of refractory material 14, as well-known in the prior art. In addition, such resolution allows determining thickness and surface roughness variations of refractory material 14 in the order of millimeters.

Peephole 21 comprises a volumetric region between innermost surface 16 and outermost surface 18 wherein refractory material 14 has been removed to provide a line-of-sight between the region outside of vessel 12 and chamber 15 of vessel 12. The cross-section of peephole 21 along an axis between innermost surface 16 and outermost surface 18 may have different shapes, such as a rectangle or a truncated triangle. However, the latter shape diverging from outermost surface 18 towards innermost surface 16 is preferred for increasing the visible region of innermost surface 16 from outside of vessel 12.

Additionally, surface profile subsystem 20 should be able to collect referencing positioning data from one or more reference points forming part of or located in the surroundings of vessel 12. Preferably, at least one of these reference points is part of the physical structure of or mechanically supports vessel 12. More preferably, one of these reference points is either a region of outermost surface 18 of refractory material 14 or an I-beam 24a, 24b used to provide structural support to refractory material 14 of vessel 12 as well-known in the prior art. Even more preferably, the measurements of the region of interest under evaluation of innermost surface 16 of refractory material 14 and the referencing positioning data from one or more reference points forming part of or located in the surroundings of vessel 12 are taken while surface profile subsystem is in the same position. Most preferably, the measurements of the region of interest under evaluation of innermost surface 16 of refractory material 14 and the referencing positioning data from one or more reference points forming part of or located in the surroundings of vessel 12 are simultaneously taken, while surface profile subsystem is in the same position. Therefore, the region under evaluation of innermost surface 16 of refractory material 14 forms part of a wall of refractory material 14 opposite the wall where the referencing positioning data from one or more reference points forming part of or located in the surroundings of vessel 12 are taken.

In general, surface profile subsystem 20 is preferably a non-contact evaluation unit that allows collecting data at a distance from a region under evaluation. Surface profile subsystem 20 comprises a first sensor 22 further comprising one element from the group of an ultrasound unit, a laser scanner, a thermal camera, a LIDAR-based device, a stereovision camera, and a radar. Those skilled in the art would realize that surface profile subsystem 20 may comprise more than one of these elements.

System 10 further comprises a data processing subsystem 25 comprising a main computer-based processor further comprising a data storage device and an executable computer code, configured to process the data collected by the first sensor 22, other historical data, operational and process parameters, and the user's input. In addition, data processing subsystem 25 can use the computer code to determine the thickness, presence of gaps within, and level of bending of the refractory material. The data processing subsystem may also be configured to process data or information from a plurality of sensors that may include one or a combination of more than one of an ultrasound unit, a laser scanner, a LIDAR device, a stereovision camera, and a radar.

In a preferred configuration and still with reference to FIG. 1, first sensor 22 comprises a laser scanning unit, which is used to transmit a first beam of light 26 to a region of innermost surface 16 and receive a first reflected beam of light from that region, timed using as reference the transmitted first beam of light 26. This allows surface profile subsystem 20 to characterize the surface roughness of that region of innermost surface 16 and measure the distance between surface profile subsystem 20 and that region of innermost surface 16. Likewise, laser scanning unit of first sensor 22 is used to transmit a second beam of light 28 to a region of outermost surface 18 and/or I-beams 24a, 24b and receive a second reflected beam of light from that region and/or I-beams 24a, 24b, timed using as reference the transmitted second beam of light 28. This allows surface profile subsystem 20 to measure the distance between surface profile subsystem 20 and that region of outermost surface 18 or I-beams 24a, 24b to establish one or more reference positioning points.

Furthermore, first beam of light 26 and second beam of light 28 can each be generated by the laser scanning unit of first sensor 22 as a plurality of independent laser beams. Alternatively, first beam of light 26 and second beam of light 28 can be generated from a single laser beam, which is redirected by a mirror rotating rapidly on two axes. This allows the collection of millions of data samples per second. In any case, to reduce the reference positioning error of the first set of data, it is important to maintain first sensor 22 in the same physical position while collecting the data associated to both first beam of light 26 and second beam of light 28. Accordingly, in this configuration, the first set of data collected by the laser scanning unit of first sensor 22 comprises the information collected from the first reflected beam of first beam of light 26 and the second reflected beam of light of second beam of light 28.

Specifically, first sensor 22 is properly positioned outside of vessel 12 next to peephole 21. This allows the laser scanning unit of first sensor 22 to both transmit first beam of light 26 to the region of innermost surface 16 under evaluation and receive the corresponding first reflected beam of light from that region through peephole 21. In this way, the laser scanning unit of first sensor 22 can measure a level of roughness of the region of innermost surface 16 under evaluation at operating temperatures of up to more than 2000° F. Typically, the operation of vessel 12 involves turning on one or more burners to heat up and maintain a specific required temperature of operation of vessel 12 depending on the material to be processed. However, when using the laser scanning unit of first sensor 22, it might be important to turn the burners of vessel 12 off. This will prevent electromagnetic interference between the laser scanning unit and the burners of vessel 12.

Data processing subsystem 25, comprises an executable computer code and several hardware components, such as a data storage device and a main computer-based processor, both of which can be integrated with first sensor 22 to process the data collected by surface profiling subsystem 20. During normal operation of system 10 for collecting the first set of data, surface profiling subsystem 20 transfers the first set of data collected to data processing subsystem 25 by means of a set of cables 19. In addition, set of cables 19 may be used to carry control, communications, and power signaling between first sensor 22 and data processing subsystem 25.

The computer-based processor of data processing subsystem 25 is configured to operate the code and to process the data collected by first sensor 22 and other data to determine the thickness, presence of gaps within, and level of bending of refractory material 14. This code is configured to measure a distance traveled by a light being transmitted by the at least one laser scanner to a predefined area of innermost surface 16 and outermost surface 18 and then being received by the at least one laser scanner unit to characterize the surface roughness of such predefined area of innermost surface 16 and record the reference positionings of innermost surface 16 and outermost surface 18.

In this particular configuration, data processing subsystem 25 can measure the relative distance from one or more reference points to the region of innermost surface 16 under evaluation. Thus, any variations in the relative distance to the reference points for measurements taken at different times will indicate a potential change in the thickness of refractory material 14 between the region of innermost surface 16 under evaluation and the corresponding opposite region of outermost surface 18 forming part of the same wall of vessel 12. This potential change in thickness might also be affected by the presence of gaps within, and the level of bending of, the refractory material 14 associated with the region under evaluation.

In an alternative embodiment, surface profiling subsystem 20 comprises at least one laser scanning unit and a surface profiling computer-based processor. In addition, surface profiling computer-based processor comprises a surface profiling data storage device and a surface profiling executable computer code.

Figure 2:
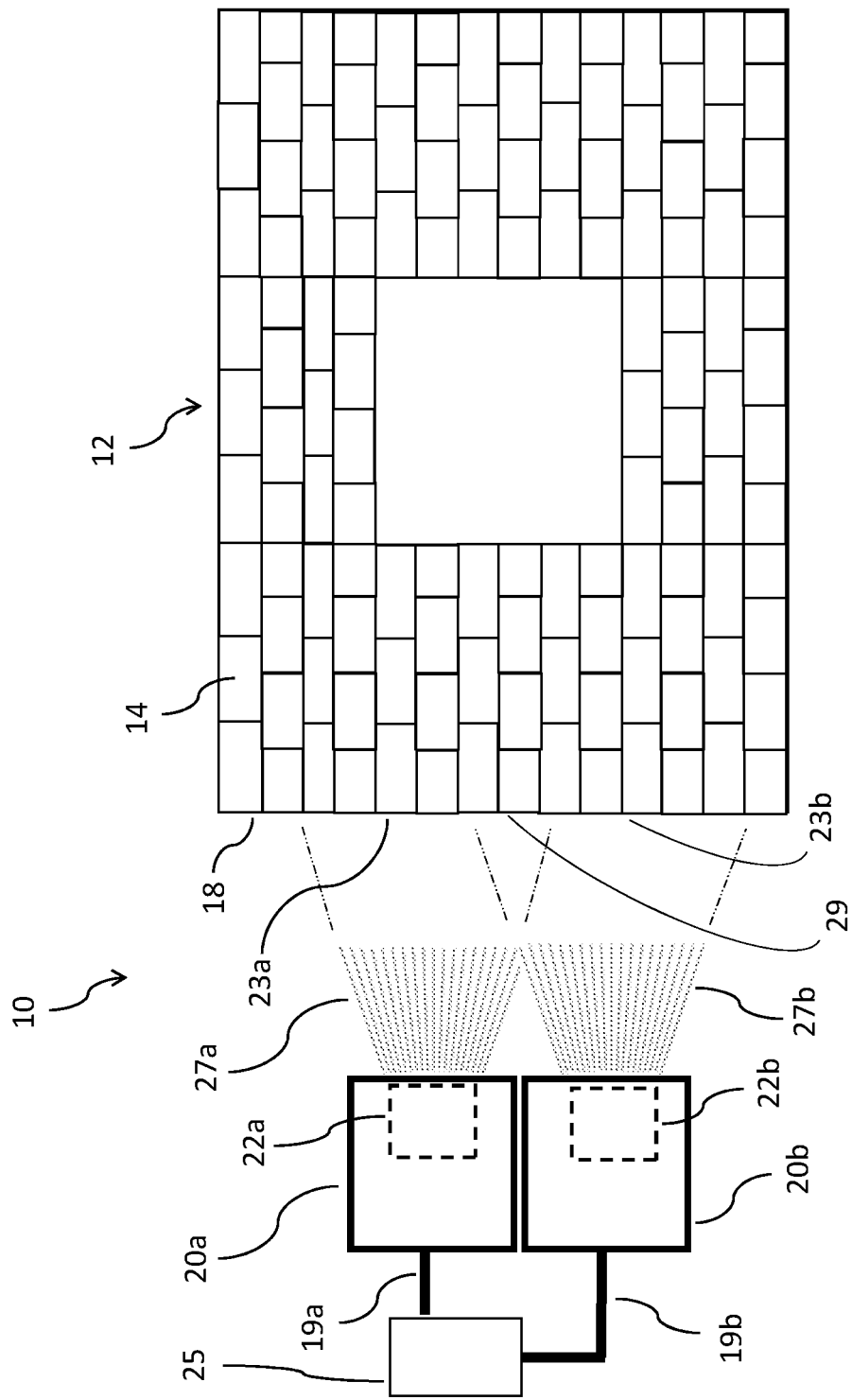
FIG. 2 shows a schematic top view of the first exemplary embodiment of a system and a set up for collecting a second set of data for evaluating a refractory material in a manufacturing vessel.

FIG. 2 shows a schematic top view of the first exemplary embodiment of system 10, in reference to FIG. 1, and a set up for collecting a second set of data for evaluating a manufacturing vessel 12. The second set of data comprises reference positioning information from a plurality of reference points associated with one or more structures forming part of or located in the surroundings of vessel 12. This plurality of reference positioning measurements is conducted by one or more surface profile subsystems 20a, 20b, using sensors 22a, 22b, and could be performed while vessel 12 is maintained at operating temperatures of up to more than 2000° F. Preferably, at least one of these reference points is, part of the physical structure of, or mechanically supports vessel 12. More preferably, at least one of these reference points is either a region of outermost surface 18 of refractory material 14 or an I-beam used to provide structural support to refractory material 14 of vessel 12 as well-known in the prior art. Most preferably, only one surface profile subsystem 20 is used and repositioned to conduct all reference positioning measurements.

Preferably, each reference positioning measurement comprises data, collected in a register, corresponding to at least an external region or part of vessel 12. More preferably, this external region includes at least a part of outermost surface 18 of refractory material 14. Accordingly, the second set of data comprises a plurality of registers, such that once these registers are processed by data processing subsystem 25 using a computer code, the relative positioning of the walls of refractory material 14 can be determined. Specifically, the relative positioning of outermost surface 18 of refractory material 14 can be determined with respect to one or more arbitrary reference points, which form part of at least one register of second set of data. In other words, the plurality of registers allows data processing subsystem 25 to at least partly construct the relative positioning of the walls of refractory material 14. Surface profiling subsystem 20a, 20b transfers the second set of data collected to data processing subsystem 25 by means of a set of cables 19a, 19b.

In a preferred configuration, first sensor 22a comprises a laser scanning unit, which is used to transmit a third beam of light 27a to a first region 23a of outermost surface 18 and/or another structural reference point of or in the surroundings of vessel 12 and receive a third reflected beam of light from first region 23a, timed using as reference the transmitted third beam of light 27a. Likewise, laser scanning unit of first sensor 22b is used to transmit a fourth beam of light 27b to a second region 23b of outermost surface 18 and/or another structural reference point of or in the surroundings of vessel 12 and receive a fourth reflected beam of light from second region 23b, timed using as reference the transmitted fourth beam of light 27b. This allows surface profile subsystem 20a, 20b to measure the distance between and the relative positioning of surface profile subsystem 20a, 20b and first region 23a and second region 23b of outermost surface 18 and/or other structural reference points of or in the surroundings of vessel 12.

Importantly, during normal operation of system 10 for collecting the second set of data, third beam of light 27a and fourth beam of light 27b should partly overlap across an overlapping region 29 of outermost surface 18 of refractory material 14. This allows the computer code of data processing subsystem 25 to properly align the data of the corresponding registers and to determine the relative positioning of first region 23a and second region 23b of outermost surface 18 and/or other structural reference points of or in the surroundings of vessel 12. Then, by repositioning surface profile subsystem 20a, 20b around vessel 12, while maintaining an overlapping of the data corresponding to registers of adjacent regions of outermost surface 18, a number of registers are taken to allow at least partly construct the relative positioning of the walls of refractory material 14.

The number of registers required for collecting the second set of data for evaluating vessel 12 depends on the distance from surface profiling subsystem 20a, 20b to first region 23a and second region 23b of outermost surface 18 of refractory material 14, the required overlapping between third beam of light 27a and fourth beam of light 27b or the dimension of overlapping region 29, the divergence of third beam of light 27a and fourth beam of light 27b, and the dimensions and shape of the walls of refractory material under evaluation. Typically, the required overlapping between third beam of light 27a and fourth beam of light 27b is at least 10 degrees. This means that the angle formed between the part of third beam of light 27a closest to fourth beam of light 27b and the part of fourth beam of light 27b closest to third beam of light 27a is at least 10 degrees. Usually, the distance from surface profiling subsystem 20a, 20b to first region 23a and second region 23b of outermost surface 18 of refractory material 14 ranges from 30 cm to 1 meter.

In an alternative preferred configuration, and in reference to FIGS. 1 and 2, a single surface profile subsystem 20 can be used to collect both first set and second set of data for evaluating vessel 12. In this case, surface profile subsystem 20 is moved around vessel 12 to collect the registers to allow at least partly construct the relative positioning of the walls of refractory material 14. Likewise, surface profile subsystem 20 should be positioned around vessel 12 to maintain a proper overlapping of the data corresponding to registers of adjacent regions of outermost surface 18.

In yet another alternative embodiment, surface profiling subsystem 20 comprises multiple beams aligned to properly overlap at a preset angle to be able to obtain a plurality of register of outermost surface of refractory material 14 with a single measurement set up.

In reference to the above-described configurations, data processing subsystem 25 can process the first set of data collected to determine the relative distance from one or more reference points to the region of innermost surface 16 under evaluation and to generate a surface roughness profile. Additionally, data processing subsystem 25 can process the second set of data to determine the relative positioning of outermost surface 18 of the walls of refractory material 14. Thus, by determining the relative positioning of innermost surface 16 and outermost surface 18 of refractory material, data processing subsystem 25 can estimate and generate a profile of the distance between innermost surface 16 and outermost surface 18 corresponding to the region of innermost surface 16 under evaluation. Moreover, this profile along with the relative positioning of outermost surface 18 of the walls of refractory material 14 allow data processing subsystem 25 to estimate the thickness of refractory material 14, a level of bending of innermost surface 16, and the potential presence of gaps between innermost surface 16 and outermost surface 18, corresponding to the region of innermost surface 16 under evaluation.

Typically, the effects of wearing and erosion on innermost surface 16 of refractory material 14 cause a reduction of the thickness of refractory material 14. This translates into a decrease of the distance between innermost surface 16 and outermost surface 18 corresponding to the region of innermost surface 16 under evaluation. However, both the bending of innermost surface 16 and the presence of gaps between innermost surface 16 and outermost surface 18 translate into an increase of the distance between innermost surface 16 and outermost surface 18 corresponding to the region of innermost surface 16 under evaluation. This decrease and increase of distances at least partly offset each other and may result in the wrongful determination of the actual thickness of refractory material 14.

Therefore, additional information, including average wearing in certain regions of innermost surface 16 of refractory material 14, according to relevant past, current, and planned operational conditions of vessel 12 should be taken into consideration. Alternatively, the results of previously taken data or collecting a third set of data using a second sensor may also be considered to properly adjust the distance between innermost surface 16 and outermost surface 18 for more accurately determining the thickness of refractory material 14. Preferably, data processing subsystem 25 is configured to handle and process these previous results, additional information, and the referenced third set of data as user's input information, data previously processed or stored in data processing subsystem 25, or data received from an external computer processor or measurement device.

Figure 3:
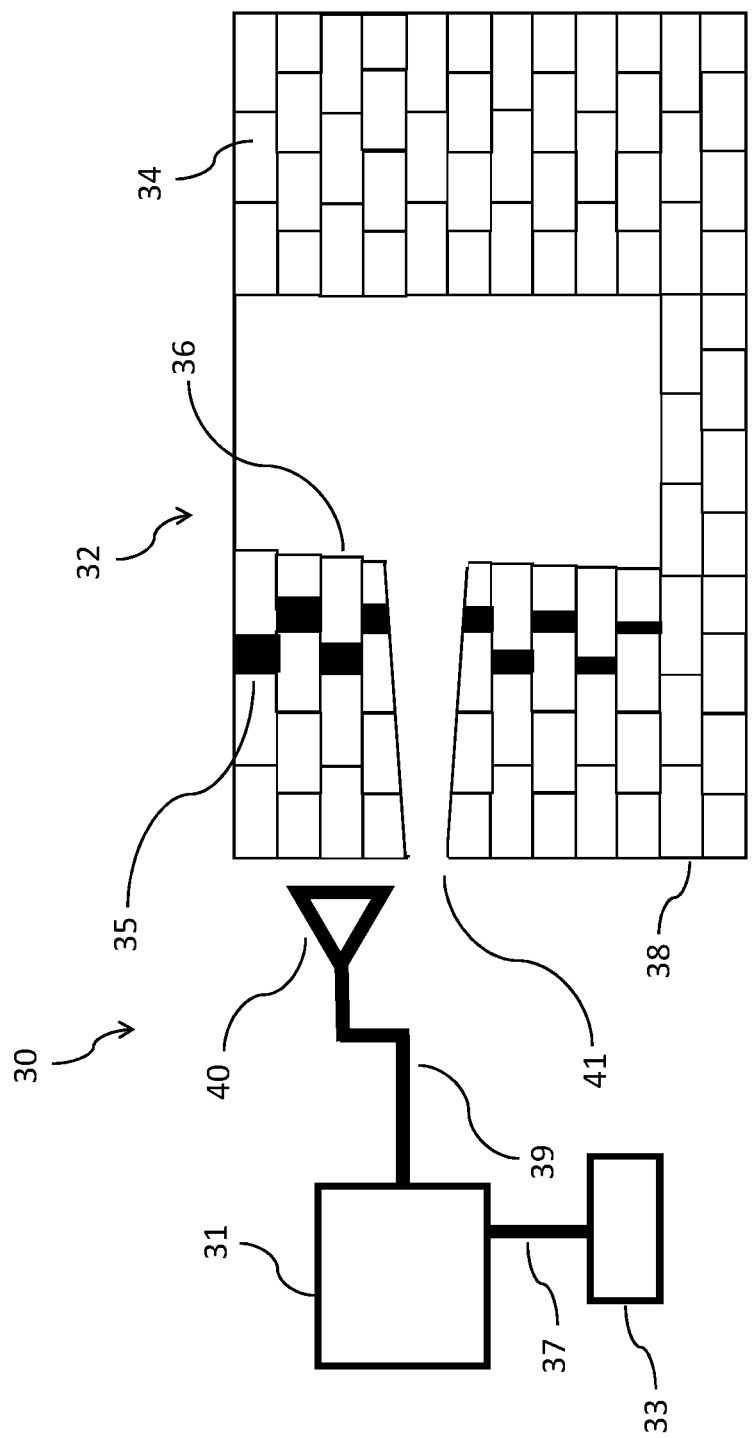
FIG. 3 shows a schematic side view of a second exemplary embodiment of a system for collecting a third set of data for evaluating a refractory material in a manufacturing vessel.

FIG. 3 shows a schematic side view of a second exemplary embodiment of a system 30 for collecting a third set of data for evaluating a refractory material 34 in a manufacturing vessel 32. System 30 comprises at least one second sensor 31 that can provide information related to the presence of a gap 35 and a level of bending of a bent innermost surface 36 of refractory material 34. The information collected by the at least one second sensor may be used to replace or complement one or more input data included as part of the first set of data or the second set of data. The second sensor may include one or a combination of more than one of an ultrasound unit, a laser scanner, a LIDAR device, a radar, and a stereovision camera. Preferably, second sensor 31 is capable of characterizing gap 35 by determining the location and dimensions of gap 35.

In a preferred configuration, system 30 comprises a second sensor 31, which consists of a radar comprising a radar antenna 40. Second sensor 31 operates by transmitting a set of electromagnetic waves into a zone having a region of interest of the material to be evaluated, wherein the referenced region of interest is within the coverage of antenna 40. After the electromagnetic waves impinge upon such region of interest, they are scattered and at least partly reflected by and at least partly transmitted through remote discontinuities. Any gaps or voids, flaws, the presence of a different material inside of the material to be evaluated, and any interface between two different materials, including air, may represent a remote discontinuity.

The scattered electromagnetic waves are received by second sensor 31 and then are measured, recorded, processed by a second sensor computer-based processor 33, and timed using as reference the electromagnetic waves transmitted or scattered from a known location of a discontinuity, such as the interface between the second sensor 31 and an outermost surface 38 of refractory material 34. Second sensor 31 is electrically connected to second sensor computer-based processor by means of a set of cables 37.

Second sensor computer-based processor 33 comprises a second sensor data storage device and a second sensor executable computer code configured to measure the electromagnetic wave received by at least one antenna 40 to produce either time domain data or frequency domain data that is transformed to time domain data. Then, these data can be used to determine a distance traveled by the electromagnetic wave received by at least one antenna 40, as well-known by those skilled in the art to determine the location of a discontinuity. Thus, the third set of data consists of time domain data or frequency domain data corresponding to the scattered electromagnetic waves from any discontinuities within refractory material 34, including the discontinuities at innermost surface 36 and outermost surface 38 of refractory material 38. In particular, second sensor 31 is electrically connected to antenna 40 by means of a set of cables 39.

Specifically, by timing the scattered electromagnetic waves received by second sensor 31, corresponding to the discontinuity between an edge of gap 35 closer to outermost surface 38 of refractory material 34, the location of gap 35 may be determined. In addition, by timing the difference between the scattered electromagnetic waves received by second sensor 31, corresponding to the discontinuity between an edge of gap 35 closer to innermost surface 36 of refractory material 34 and the corresponding edge of gap 35 closer to outermost surface 38, the dimensions of gap 35 may be determined. Moreover, by timing the scattered electromagnetic waves received by second sensor 31, corresponding to the discontinuity at innermost surface 36 of refractory material 34, over a certain region of innermost surface 36, a profile of innermost surface 36 over that region may be generated to determine the level of bending of the location of gap 35.

In an alternative configuration, antenna 40 is preferably embedded within refractory material 34, more preferably using one or more casted refractory bricks, such that antenna 40 fits into refractory material 34 without having a spacing between the radiating edges of antenna 40 and refractory material 34. However, this is only possible to implement during the initial construction or during major repairs of vessel 32.

In any case, preferably, second sensor 31 is used to collect a third set of data over a certain region of interest of refractory material 34 after data processing subsystem 25 of system 10, in reference to FIG. 1 and FIG. 2, has identified a region of interest as compromised for having a significant wearing or the potential presence of gap 35 or a possible bending of innermost surface 36 of refractory material 34, based on the results of collecting and processing the first set and second set of data. More preferably, second sensor 31 is set up to continuously or periodically monitor the compromised region of interest to more accurately determine the thickness of refractory material in such region. Typically, second sensor 31 is positioned outside of vessel 12 in close proximity to outermost surface 38 of refractory material 34, such that antenna 40 is able to direct a transmitted electromagnetic wave over the compromised region of interest of refractory material 34, without blocking a peephole 41 for having line-of-sight access to the interior of vessel 12.

Preferably, the thickness of refractory material 14 prior to the processing of a molten material in vessel 12 is used as input to data processing subsystem 25. Accordingly, the presence of gaps within the refractory material 14, the bending level of the innermost surface 16 of refractory material 14, and the wear of innermost surface 16 of refractory material 14 might be more accurately estimated by data processing subsystem 25. And as a result, further determining the actual thickness of refractory material 14 and estimating the remaining operational life and the maintenance plan of vessel 12.

In general, those skilled in the art will recognize that calculation methods exist for estimating the thickness of refractory material 14. However, the possibilities for accurately determining it, as described above, are not available in the prior art, especially while the vessel is maintained at operating temperatures of up to more than 2000° F. As a result, typically the decisions regarding safety operation, remaining operational life, and maintenance of vessel 12 must be taken manually and/or while the furnace is not operating.

Specifically, this invention discloses system 10, to accurately determine the thickness of refractory material 14 of vessel 12 for estimating the remaining operational life of vessel 12, and determining what, and when to perform, preventive and corrective maintenance actions, regarding vessel 12. More specifically, by correlating a first and second sets of data, as disclosed above, one skilled in the art at the time the invention was made would readily understand how to make and use the invention.

In particular, the output from data processing subsystem 25 may further comprise a determination of the remaining thickness, the surface profile, or the rate of degradation over time of refractory material 14 of vessel 12 to estimate the remaining operational life and or an improved maintenance plan of vessel 12, including preventive or corrective maintenance of vessel 12. Moreover, data processing subsystem 25 may control the operation of first sensor 20. It is noted that the additional hardware components of data processing subsystem 25 have not been shown as these components are not critical to the explanation of the above-indicated embodiments, and the functions and configurations of these components are well-known in the prior art. Furthermore, in reference to FIG. 1, those skilled in the art will realize that set of cables 19 may be replaced with a wireless system to couple first sensor 20 to data processing subsystem 25.

In an alternative embodiment, data processing subsystem 25 may further comprise a customized artificial intelligence-based software. This software may comprise one or more customized machine learning-based algorithms developed to predict the degradation and wearing of the material under evaluation as well as to estimate the remaining operational life and to improve the maintenance plan of the vessel. In particular, the estimates of the thickness of a refractory material, using the first sensor at certain locations, operational parameters and observations, and previous knowledge of the thickness of the refractory material, provide a data set that can be used to train these algorithms. Once the customized algorithms are trained for each of the different zones of a predefined region of interest of vessel 12, their performance can be improved with additional estimations of the refractory thickness at different stages of the vessel's life. Alternatively, all the thickness estimation data of refractory material 14, collected over time, may be used for training or model-building of one or more of the specific artificial intelligence algorithms.

Furthermore, data processing subsystem 25 may also provide a status of refractory material 14 comprising a level or rate of degradation of such material due to various factors, including operational wear, age, and presence of flaws, cracks, corrosion, and erosion of refractory material 14. Accordingly, data processing subsystem 25 may enable system 10 to estimate the remaining thickness of refractory material 14, which is useful to estimate the remaining operational life and to improve the maintenance plan of vessel 12.

In addition, system 10 may further comprise a software subsystem configured to enable a user to control one or more computer-based processors for handling the collected data. This data handling includes measuring, storing, monitoring, recording, processing, mapping, visualizing, transferring, analyzing, tracking, and reporting of these data for calculating the risk of operating vessel 12 and to determine the presence of certain flaws and the remaining thickness of refractory material 14. Accordingly, an estimation of the overall health of vessel 12 might be obtained. In addition, a software subsystem might be configured to monitor and control the system operations not only locally, but also remotely through a computer network or a cloud computing environment.

Moreover, data processing subsystem 25 may further comprise data processing and image processing algorithms implemented by using one or a combination of more than one technique. These techniques may include Fourier transform, spectral analysis, frequency- and time-domain response analyses, digital filtering, convolution and correlation, decimation and interpolation, adaptive signal processing, waveform analysis, and data windows and phase unwrapping for data processing; and time domain, back projection, delay and sum, synthetic aperture radar imaging, back propagation, inverse scattering, and super-resolution, either with or without the application of differential imaging, for image processing. The signal processing technique may be selected according to a characteristic of the material under evaluation, such as thickness, number of layers, type, and dimensions.

In the various embodiments described, the measurements are conducted in regions of the innermost surface of the refractory material not in contact with the molten material to determine the corresponding thickness of the refractory material. However, these measurements can also be used to estimate the thickness of the refractory material in all regions of the refractory material, based on historical, statistical, and trending data, prior measurements, user's input information, and operational and process parameters associated with the vessel.

The various embodiments have been described herein in an illustrative manner, and it is to be understood that the terminology used is intended to be in the nature of words of description rather than of limitation. Any embodiment herein disclosed may include one or more aspects of the other embodiments. The exemplary embodiments were described to explain some of the principles of the present invention so that others skilled in the art may practice the invention.

Method

Figure 4:
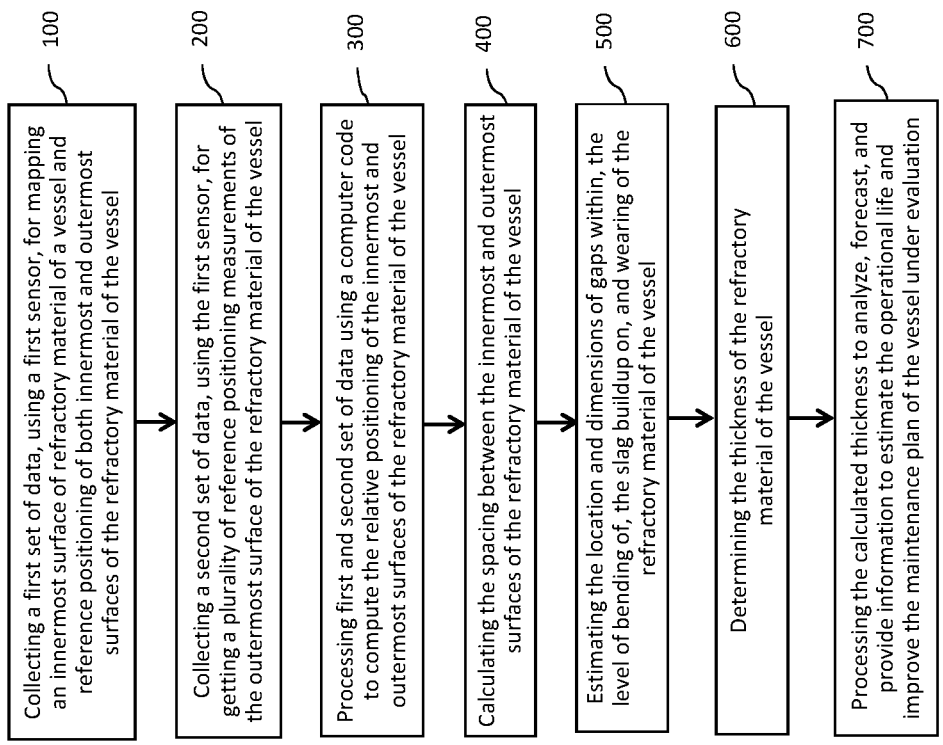
FIG. 4 shows a schematic view of a method for evaluating a refractory material in a manufacturing vessel.

The method for determining the thickness of a refractory material in a manufacturing vessel is operative to combine a plurality of data with a computer code to estimate the operational condition of the vessel and provide information to estimate the remaining operational life and to improve the maintenance plan of the vessel. FIG. 4 shows a schematic view of a method for accurately determining the thickness of a refractory material in a manufacturing vessel, while the vessel is maintained at operating temperatures of up to more than 2000° F.

The information used may include data collected using a surface profile subsystem. A first set of data includes a surface roughness profile for mapping an innermost surface of the refractory material under evaluation and reference positioning measurements of both the innermost and outermost surfaces of the refractory material of the vessel, preferably, while the surface profile subsystem is in the same position. More preferably the first set of data is taken simultaneously. A second set of data comprises a plurality of registers associated with multiple reference positioning measurements of the outermost surface of the refractory material, while the surface profile subsystem is moved around the vessel. Additional information collected prior to, during, or after the operation of the vessel may also be used. Then, a data processing subsystem will process the data to initially determine the thickness of the refractory material. Finally, the presence of gaps within, the refractory material under evaluation along with the level of bending of innermost surface of the refractory material will be estimated to adjust and accurately determine the thickness of the refractory material and to estimate the remaining operational life and improve the maintenance plan of the vessel, according to the following steps:

1. At step 100, collecting a first set of data, using a first sensor, for mapping a region of interest of an innermost surface of a refractory material of a manufacturing vessel and getting reference positioning measurements of both the innermost and the outermost surfaces of the refractory material of the vessel.
    Preferably, both the data associated with mapping and the data associated with reference positioning are collected simultaneously. However, these data might be taken at different times, while first sensor is more preferably located in the same position. The referencing positioning data might be collected in reference to one or more points forming part of or located in the surroundings of the vessel. Preferably, at least one of these reference points is, part of the physical structure of, or mechanically supports the vessel, including a region of the outermost surface of the refractory material.
    Importantly, the first set of data might be collected through a peephole of the vessel, while the vessel is maintained at operating temperatures of up to more than 2000° F. Therefore, the innermost surface of the refractory material under evaluation and the outermost surface of the refractory material used as part of the referencing positioning data are located in opposite refractory walls of the vessel.
    Preferably the first sensor comprises a surface profile subsystem, comprising a laser scanning unit, for mapping or measuring the surface roughness of the region under evaluation. In such a case, the burners of the vessel might need to be turned off to prevent electromagnetic interference between the burners and the laser scanning unit.
2. Next, at step 200, collecting a second set of data, using at least one first sensor, for getting a plurality of reference positioning measurements of the outermost surface of the refractory material of the vessel.
    Preferably, each reference positioning measurement comprises a register of at least an external region or part of vessel, including the outermost surface of the refractory material. This plurality of reference positioning measurements could be performed while the vessel is maintained at operating temperatures of up to more than 2000° F.
    More preferably, the first sensor comprises a surface profile subsystem, comprising a laser scanning unit. Even more preferably, only one laser scanning unit is used and repositioned around the perimeter of the vessel after each measurement, while maintaining an overlapping of at least 10 degrees between laser scans corresponding to adjacent measurements. Most preferably, the laser scanning unit is repositioned around the perimeter of the vessel until the relative positioning of the walls of refractory material can be determined, based on the shape of the vessel.
3. Next, at step 300, processing the first set of data and the second set of data using a computational algorithm to compute the relative positioning of the innermost surface and the outermost surface of the refractory material of the vessel with respect to one or more reference points. This allows to at least partly construct the relative positioning of the walls of refractory material.
4. Next, at step 400, calculating the spacing between the innermost surface and the outermost surface of the refractory material of the vessel by computing the difference between the relative positioning of these surfaces with respect to at least one reference points.
5. Next, at step 500, estimating the location and dimensions of gaps within, the level of bending of, and the wearing of the refractory material of the vessel.
    The spacing between the innermost and outermost surfaces of the refractory material of the vessel calculated in step 400 includes the thickness of the refractory material; an increase due to potential gaps within and bending of the refractory material of the vessel; and a decrease due to wearing of the innermost surface of the refractory material of the vessel. Preferably, the location and dimensions of gaps within the refractory material are estimated based on measurements using a second sensor, such as a radar. Likewise, the bending level of the innermost surface of the refractory material is preferably determined by comparing the relative positioning of the innermost surface of the refractory material with one or more reference points corresponding to actual or previous positions of such surface. The wearing of the refractory material might be estimated by the historical and statistical corresponding to the operational and process parameters of the vessel along with comparisons to previous measurements. Importantly, a slag buildup on the innermost surface of the refractory material may also increase the spacing between the innermost and outermost surfaces of the refractory material of the vessel calculated in step 400. However, in any case, historical, statistical, or trending data, including previous measurements, along with user's input information or operational or process parameters may be used for any of these estimations.

6. Next, at step 600, determining the thickness of the refractory material of the vessel by adding the values of the estimated dimension of the gaps, perpendicular to the innermost surface of the refractory material; the bending of the innermost surface of the refractory material; from step 500, and by subtracting the value of the estimated reduction in thickness of the refractory material due to wearing from step 500, to and from the calculated spacing between the innermost surface and the outermost surface of the refractory material in step 400, respectively. The thickness of the refractory material for the region under evaluation should be determined, as indicated, for a number of points spaced within the region to provide a profile of the thickness of the refractory material. Typically, a spacing of 0.25 cm to 3 cm is used between adjacent points within the region.

7. Last, at step 700, processing the thickness values of the refractory material of the vessel, determined in step 600, to analyze, forecast, and provide information useful to estimate the remaining operational life and to improve the maintenance plan of the vessel under evaluation.

Preferably, at least one signal processing method is selected to process the data according to a characteristic of the refractory material of the vessel. More preferably, multiple evaluations over the remaining operational life of the vessel are performed to predict the degradation and wearing of the refractory material under evaluation more accurately to better estimate the remaining operational life and to improve the maintenance plan of the vessel.

In reference to step 100 and step 200 above, it is to be understood that these steps might reversed. In other words, the second set of data might be collected before collecting the first set of data. Additionally, in reference to steps 100 and 200 above, those skilled in the art would realize that a plurality of techniques and methods, based on a variety of sensors, including acoustic, radar, LIDAR, laser, infrared, thermal, and stereovision sensors, can be used to collect relevant data related to a manufacturing vessel. Those skilled in the art will also recognize that the steps above indicated can be correspondingly adjusted for a specific vessel and type of refractory material.

Once the thickness of the refractory material is determined, and the remaining operational life and improvement of the maintenance plan of the vessel is estimated, a rate of degradation due to various factors, including operational wear, age, and presence of flaws, cracks, and erosion might also be estimated. In addition, multiple evaluations of the status of a material over time may be used to create trends to estimate such material degradation as well as forecast the remaining operational life and improve the maintenance plan of the vessel.

The present system and method for accurately determining the thickness of the refractory material of a manufacturing vessel and for providing information to estimate the remaining operational life and to improve the maintenance plan of the vessel have been disclosed herein in an illustrative manner, and it is to be understood that the terminology which has been used is intended to be in a descriptive rather than in a limiting nature. Those skilled in the art will recognize that many modifications and variations of the invention are possible in light of the above teachings. The present invention may be practiced otherwise than as specifically described within the scope of the appended claims and their legal equivalents.

We claim:

1. A system for determining a thickness of a refractory material forming part of a manufacturing vessel, wherein an innermost surface of said refractory material of said vessel is partly exposed to a molten material different from said refractory material, said system comprising:

a. a surface profile subsystem comprising a first sensor to collect a first set of data, wherein said first set of data comprises surface roughness data of at least a region of interest of said innermost surface of said refractory material and reference positioning data of both said innermost surface of said refractory material and at least one reference point that can be associated with an outermost surface of said refractory material of said vessel; wherein said first sensor further collects a second set of data, and wherein said second set of data comprises reference positioning information from a plurality of registers that can be associated with said at least one reference point that can be associated with said outermost surface of said refractory material, wherein said at least one reference point that can be associated with said outermost surface of said refractory material is located apart from a wall comprising said region of interest of said innermost surface of said refractory material, wherein said first sensor is able to collect at least said first set of data contactless at a distance from said region of interest of said innermost surface of said refractory material and b. a data processing subsystem comprising a computer-based processor, wherein said computer-based processor comprises a data storage device and an executable computer code configured to process at least said first set of data and said second set of data;

wherein said computer code properly aligns said first set of data and said second set of data to determine a relative positioning of, and a spacing between, said innermost surface of said refractory material and said outermost surface of said refractory material, wherein said executable computer code comprises at least one customized machine learning algorithm, and wherein said executable computer code, said customized machine learning algorithm, and said data processing subsystem are configured to at least partly estimate a presence and dimensions of one or more gaps within said refractory material of said vessel.

2. The system of claim 1, wherein said first set of data is taken simultaneously, while said first sensor remains in a single position.

3. The system of claim 1, wherein said at least one reference point that can be associated with said outermost surface of said refractory material of said vessel is selected from a group consisting of an element forming part of said vessel and an element located in the surroundings of said vessel.

4. The system of claim 3, wherein said element forming part of said vessel is selected from a group consisting of an element forming part of a physical structure of said vessel and an element that mechanically supports said vessel.

5. The system of claim 4, wherein said element that mechanically supports said vessel is an I-beam used to provide structural support to said refractory material of said vessel.

6. The system of claim 1, wherein at least one of said plurality of registers is associated with said at least one reference point that can be associated with said outermost surface of said refractory material and said plurality of registers are associated with each other.

7. The system of claim 6, wherein said plurality of registers are associated with each other by at least partly sharing data corresponding to said outermost surface of said refractory material of said vessel.

8. The system of claim 7, wherein said first sensor comprises a laser scanning unit and said plurality of registers are associated with each other by at least partly sharing data resulting from an overlapping of at least 10 percent between any two adjacent beams of light, generated by said laser scanning unit and used to collect at least part of said second set of data, corresponding to different registers of said plurality of registers.

9. The system of claim 1, wherein said region of interest of said innermost surface of said refractory material and said at least one reference point that can be associated with said outermost surface of said refractory material of said vessel are in opposite walls of said refractory material of said vessel.

10. The system of claim 1, wherein said data processing subsystem at least partly construct a positioning of all walls of said refractory material of said vessel, based on said determined relative positioning of, and said spacing between, said innermost surface of said refractory material and said outermost surface of said refractory material.

11. The system of claim 1, wherein at least one of said first set of data and said second set of data is collected while said vessel is maintained at operating temperatures of up to more than 2000° F.

12. The system of claim 1, wherein said data processing subsystem is further configured to at least partly estimate said presence and said dimensions of said one or more gaps within, said bending of, a slag buildup on, and a wearing of, said innermost surface of said refractory material of said vessel, based on an element selected from a group consisting of a historical data, a statistical data, a trending data, a prior measurement, a user's input information, an operational parameter, and a process parameter associated with said vessel.

13. The system of claim 1, wherein said data processing subsystem is further configured to perform an action selected from a group consisting of estimating a remaining operational life of said vessel and enhancing a maintenance plan of said vessel.

14. The system of claim 1 further comprising at least one second sensor comprising an element selected from a group consisting of a radar, an infrared camera, and a thermal imaging camera.

15. The system of claim 1, wherein said at least one second sensor is at least partly embedded in said refractory material.

16. The system of claim 15, wherein said at least one second sensor is at least partly embedded in at least one casted portion of said refractory material.

17. The system of claim 14, wherein said data processing system is further configured to identify a weak region of said refractory material of said vessel and said at least one second sensor is used to monitor said weak region.

18. The system of claim 1, wherein said first sensor comprises an element selected from a group consisting of an ultrasound unit, a laser scanner, a LIDAR device, a radar, and a stereovision camera.

19. A method for determining a thickness of a refractory material forming part of a manufacturing vessel, wherein an innermost surface of said refractory material of said vessel is partly exposed to a molten material different from said refractory material, said system comprising:

a. providing a surface profile subsystem comprising a first sensor to collect a first set of data, wherein said first set of data comprises surface roughness data of at least a region of interest of said innermost surface of said refractory material and reference positioning data of both said innermost surface of said refractory material and at least one reference point that can be associated with an outermost surface of said refractory material of said vessel; wherein said first sensor further collects a second set of data, and wherein said second set of data comprises reference positioning information from a plurality of registers that can be associated with said at least one reference point that can be associated with said outermost surface of said refractory material, wherein said at least one reference point that can be associated with said outermost surface of said refractory material is located apart from a wall comprising said region of interest of said innermost surface of said refractory material, wherein said first sensor is able to collect at least said first set of data contactless at a distance from said region of interest of said innermost surface of said refractory material and a data processing subsystem comprising a computer-based processor, wherein said computer-based processor comprises a data storage device and an executable computer code configured to process at least said first set of data and said second set of data; wherein said computer code properly aligns said first set of data and said second set of data to determine a relative positioning of, and a spacing between, said innermost surface of said refractory material and said outermost surface of said refractory material, wherein said executable computer code comprises at least one customized machine learning algorithm, and wherein said executable computer code, said customized machine learning algorithm, and said data processing subsystem are configured to at least partly estimate a presence and dimensions of one or more gaps within said refractory material of said vessel;

b. collecting said first set of data, using said first sensor, for mapping said region of interest of said innermost surface of said refractory material of said manufacturing vessel and getting said reference positioning data of said innermost surface and said outermost surface of said refractory material of said vessel;

c. collecting said second set of data, using said first sensor, for getting said plurality of registers corresponding to said outermost surface of said refractory material of said vessel;

d. processing said first set of data and said second set of data using said executable computer code to compute said relative positioning of said innermost surface of said refractory material and said outermost surface of said refractory material of said vessel; and e. calculating said spacing between said innermost surface of said refractory material and said outermost surface of said refractory material of said vessel.

20. The method of claim 19, further comprising the steps of:

f. estimating said presence and said dimensions of said one or more gaps within, said level of bending of, a slag buildup on, and a wearing of, said innermost surface of said refractory material of said vessel, wherein at least part of said estimating is based on an element selected from a group consisting of a historical data, a statistical data, a trending data, a prior measurement, a user's input information, an operational parameter, and a process parameter associated with said vessel;

g. determining said thickness of said refractory material of said vessel, based on said estimated dimensions of said one or more gaps, perpendicular to said innermost surface of said refractory material; said bending of said innermost surface of said refractory material; said estimated slag buildup on said refractory material; and said estimated wearing of said innermost surface of said refractory material.

21. The method of claim 20, further comprising a step of processing a determined thickness of said refractory material of said vessel to analyze, forecast, and provide information to perform at least an action selected from a group consisting of estimating a remaining operational life of said vessel and improving a maintenance plan of said vessel.

* * * * *